Aug. 17, 1937.　　H. W. ALTORFER　　2,090,092
SWINGING IRONING MACHINE COVER
Original Filed Jan. 21, 1935　　3 Sheets-Sheet 2
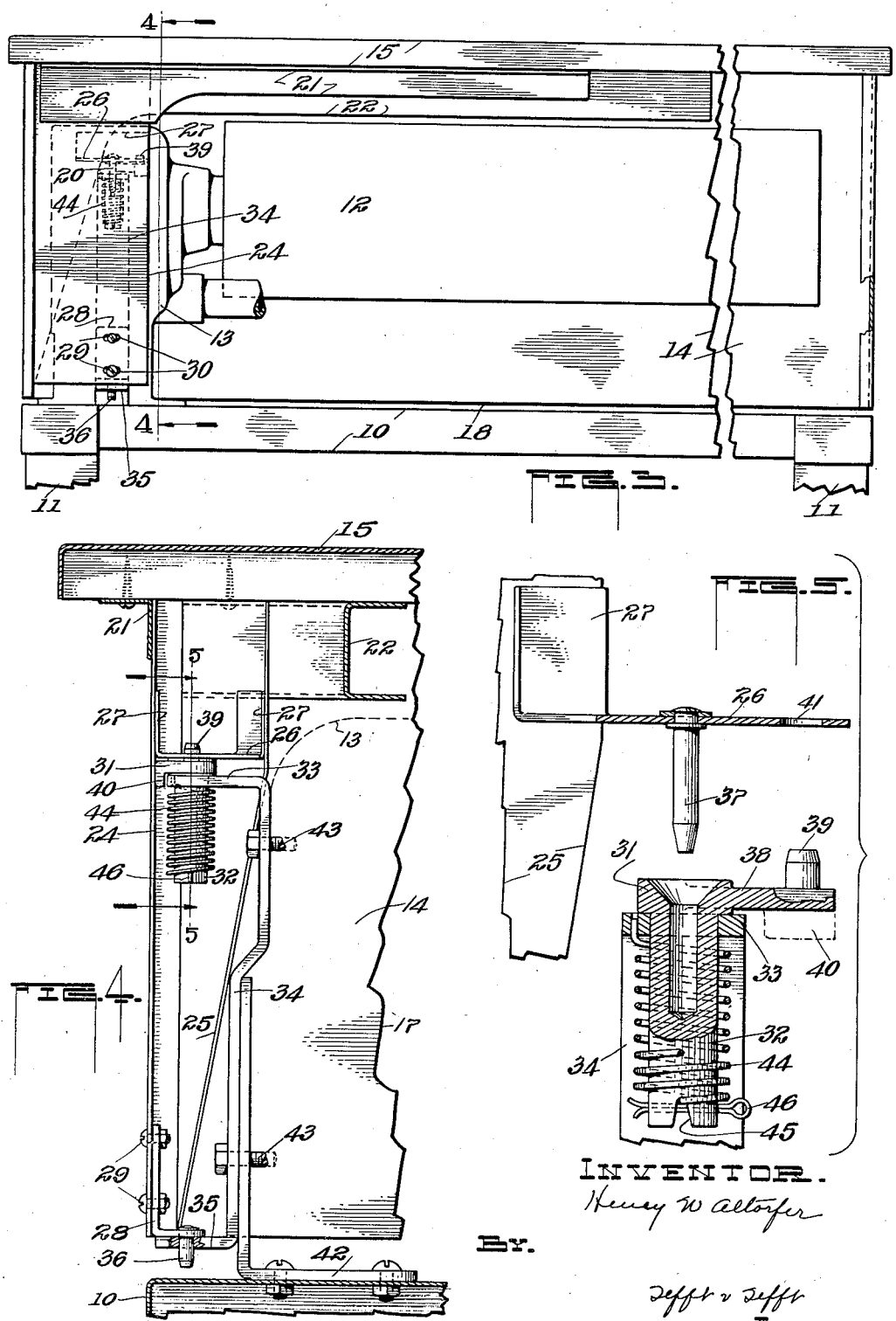

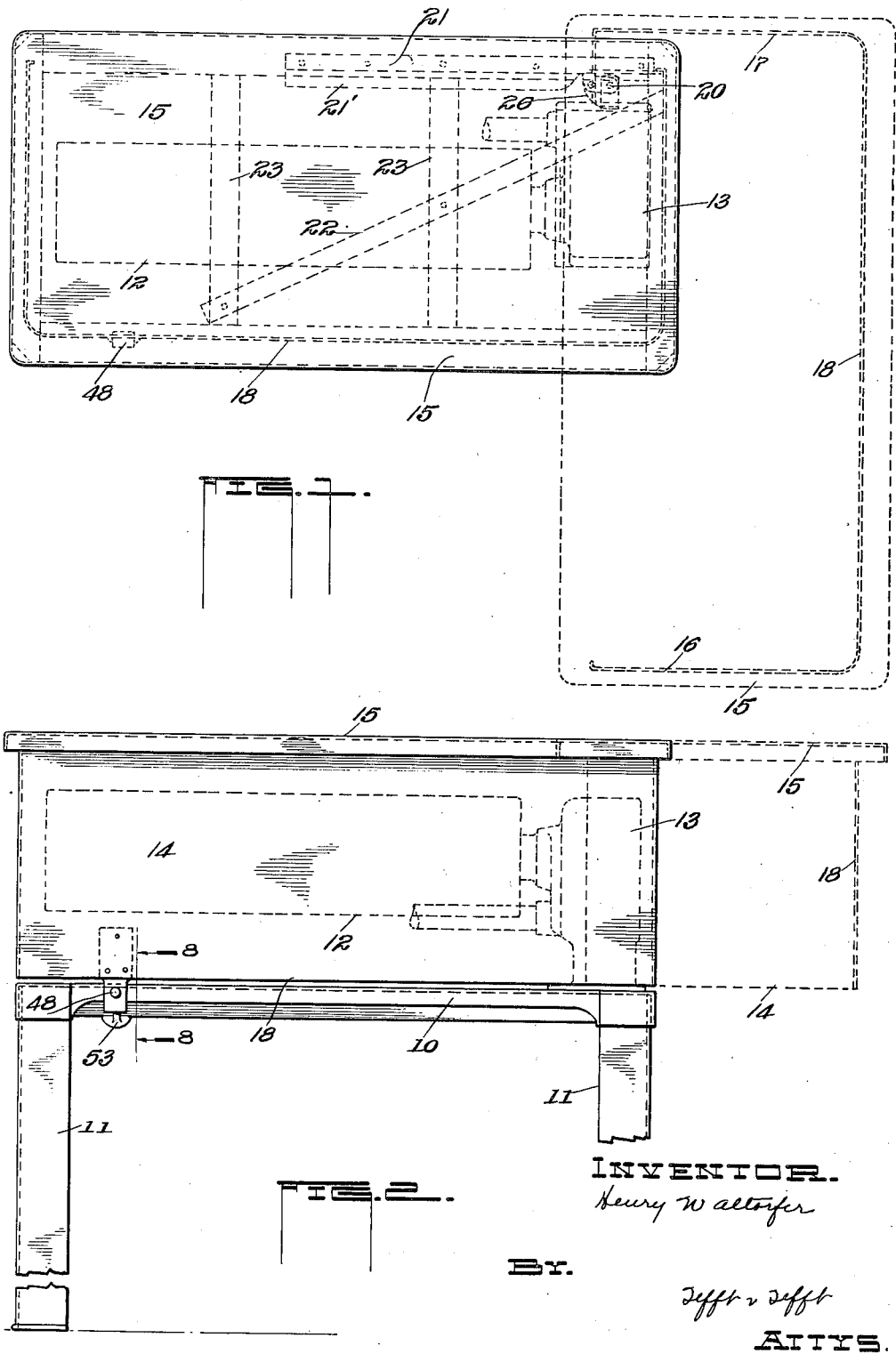

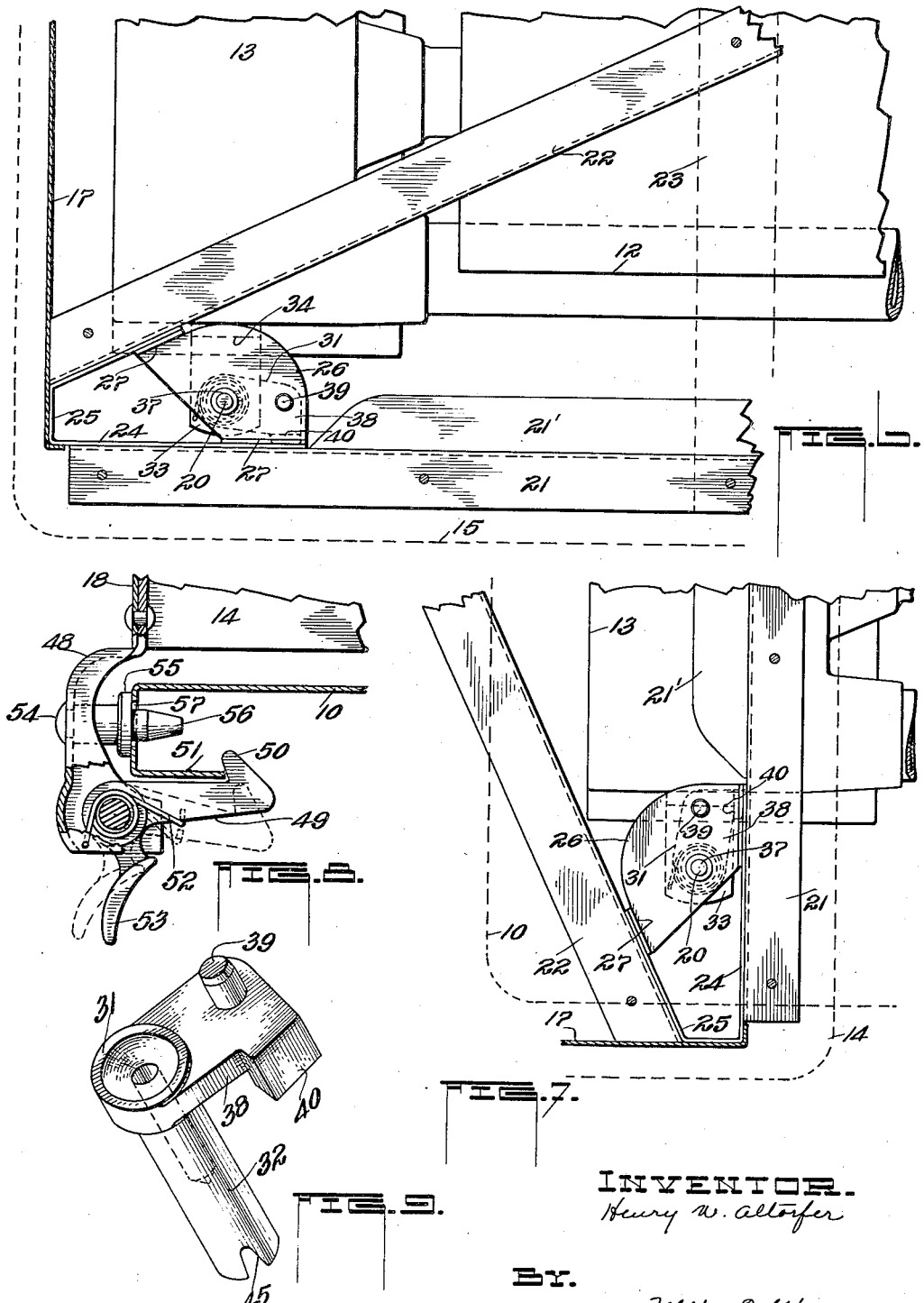

Patented Aug. 17, 1937

2,090,092

UNITED STATES PATENT OFFICE 2,090,092

SWINGING IRONING MACHINE COVER

Henry W. Altorfer, Peoria, Ill.

Application January 21, 1935, Serial No. 2,777
Renewed December 7, 1936

10 Claims. (Cl. 45—68)

This invention is directed to cabinet structures for ironing machines and has for one of its objects the provision of a supporting structure for ironing machines which includes a removable cover.

Another object lies in the provision of a supporting structure as aforesaid, which includes a cover member mounted thereon in a manner to be pivotally moved in a horizontal plane to expose the enclosed ironing machine for use.

A further object is to provide a cover which is movable as aforesaid and in addition is, by means of simple manipulation, removable from the supporting structure.

Another object lies in the provision of means for tensioning the pivotal supporting elements of the cover in such a manner as to urge the cover to move toward open position.

An additional object is to provide a cover biased toward open position and means for holding the cover closed in opposition to the biasing means.

Another object is to provide means for supporting the overlying portion of the cover to assist its normal supporting structure when the cover is in closed position.

A further object is to provide means for adjusting the alignment of the cover with respect to its support whereby to assure proper alignment and functioning of the cover.

Ironing machines are well known in the market and domestic types thereof are extensively used in residences in family laundering activity. In order that they be made desirable for use in a home it is necessary that they be provided with suitable supporting means and covers. Obviously any cover means used must be effective as a cover, and the same should have a neat appearance. In addition, the cover should be conveniently removable to expose the ironer for use and equally convenient to replace.

It is to this end that I provide the device disclosed herein, described with reference to the accompanying drawings in which;

Fig. 1 is a plan view showing an outline of my device with dotted outline of the cover portion thereof in open position;

Fig. 2 is a side elevational view of the same, also showing a dotted outline of the cover in open position;

Fig. 3 is a fragmented side elevational view showing details of the parts disclosed in Fig. 2 as the same would be viewed from the side opposite that shown in Fig. 2.

Fig. 4 is an enlarged fragmental sectional view showing details of mechanism to be described, the same being taken from line 4—4 in Fig. 3.

Fig. 5 includes enlarged fragmental sectional elevational views showing details of parts to be described, the same being taken on line 5—5 in Fig. 4;

Fig. 6 is an enlarged fragmental plan view with certain portions of the structure removed to permit clear illustration of framing members to be described;

Fig. 7 is a fragmental view showing parts disclosed in Fig. 6 in operated position, as will be explained;

Fig. 8 is an enlarged fragmental view taken from line 8—8 in Fig. 2, showing details of a latching and supporting mechanism to be described; and Fig. 9 is an enlarged perspective view showing an element of the cover support mechanism to be described.

Figs. 1 and 2 disclose my device embodied in a structure including a table top 10 supported upon legs 11, the table being adapted to support a rotary ironer including a roll 12 and a supporting housing structure 13. Since the ironer may be any one of several well known models and the mechanism thereof does not form a part of my present invention, it will not be described further than to say that a portion of the housing structure 13 may be utilized to support a portion of the mechanism about to be described.

The principal elements of my invention consist of the table and ironing machine above noted and a cover member designated 14.

The cover 14 is pivotally supported to be moved to the positions indicated by outlines in Figs. 1 and 2 wherein solid lines indicate the closed position, and dotted lines indicate the open position.

The cover member consists of a top portion 15 to which is secured depending end walls 16 and 17 and a front wall 18.

The construction described obviously provides a cover member open upon its bottom and upon one side.

Fig. 2 illustrates that the walls of the cover are so proportioned as to approximately align with the edges of the table top 10 to give it a neat well fitted appearance.

The cover is pivotally supported at 20 by means of a mechanism including a framing member 21 having a reinforcing part 21' extending longitudinally under and adjacent the rear edge of the top 14, and a second member 22 disposed to lie with its inner end adjacent the pivot 20 and its outer end adjacent the front wall 18 of the cover. The cover structure also includes cross reinforcing members 23, to both of which member 22 is attached with the rearward end of one attached to member 21. The general arrangement of the above noted members is clearly indicated in Fig. 1.

The converging ends of members 21 and 22 are shown in Figs. 4 and 6 to be attached to the upper end of an angulated upright member 24 which has a wall portion 25 attached to the cover wall 17. By means of the construction shown the cover structure is stiffened and supported, as will now be explained.

Toward the upper end of member 24 there is a cross member or bracket 26 having upwardly directed end portions 27 by means of which the bracket is firmly secured to opposite walls of member 24 and upon the back wall of the member, at its lower end, there is secured a bracket member 28. As indicated in Fig. 3, bracket 28 is secured by means of screws 29 disposed in slots 30 in the back wall. The purpose of this adjustable connection is to provide means for properly aligning the cover with respect to the table top.

It will be apparent that bracket 26 rests upon the upper surface of a member 31, illustrated in Figs. 5 and 9, which has a depending body portion 32 rotatably fitted in an outwardly directed arm portion 33 of a bracket fixture 34.

The lower bracket 28 rests upon a lower arm extension 35 of bracket 34 and bracket 28 carries a stud 36 which is rotatably fitted in an opening in the arm as shown.

Fig. 5 illustrates a stud 37 secured in bracket 26 and a complementary opening in the body 32 of member 31.

The opening is adapted to receive the stud in movable relation when bracket 26 rests upon member 31 as in Fig. 4. It is to be noted that member 31 has an extending arm 38 which carries an upwardly directed stud 39 and a depending lip portion 40 and when bracket 26 rests upon member 31 as noted, the stud is received in an opening 41 in the bracket. By means of the mechanism described the cover is supported upon the bracket 34 in pivotally movable relation. Bracket 34 is supported upon a foot fixture 42 which may be attached to the table top 14, as shown, or to the housing structure 13 of the ironing machine as by means of screws 43, or both.

When mounted as described the cover is freely movable to open or closed position as above noted.

To urge the cover toward open position I provide a spring 44 coiled about the body 32, having its upper end anchored in arm 33 and its lower end engaged in a slot 45 in body 32, it being retained therein by means of a cotter 46. The spring is so proportioned and tensioned as to rotate member 31 and, through the connection afforded by stud 39 the cover, into open position.

Figs. 6 and 7 indicate that when the cover is in closed position, Fig. 6, member 31 is rotated in direction opposed to spring 44, and when it is in open position, member 31 is rotated to place the lip portion 40 in engagement with arm 33 of bracket 34 whereby the cover is prevented from opening beyond a predetermined point, such as is indicated in Fig. 1.

It will now become apparent that with the force of spring 44 opposed by arm 33 the cover may be elevated to withdraw studs 36, 37 and 39 from their respective openings and the cover may be removed entirely from the supporting structure. Since the force of spring 44 is opposed by reason of engagement of lip 40 with arm 33, removal of the cover may be effected without disturbance of member 31 and thus the cover may be conveniently removed and replaced at will. Replacement of the cover is further facilitated by reason of the stud 37 being made longer than studs 36 and 39, and the upper end of the receptacle in member 31 is flared as shown in Fig. 5, and this arrangement facilitates proper initial alignment of the parts for re-assembly.

Fig. 8 illustrates a latching mechanism adapted to hold the cover closed in opposition to spring 44.

The mechanism is attached to the front wall 18 of the cover and is disposed approximately as shown in Fig. 2.

The fixture comprises a bracket 48 depending from the cover wall which supports a pivotally mounted latch member 49 having a hook portion 50 adapted to engage an inwardly directed edge 51 of the table top 10. Portion 50 is resiliently urged toward latching position by a spring 52.

The latching member is provided with a depending hand grip portion 53 by means of which, when it is desired to move the cover to open position, the latch may be manipulated as indicated in dotted lines to disengage the hook portion 50.

It is to be noted that bracket 48 also carries a stud 54 having an abutment flange 55 and a chamfered end portion 56. Table top 10 is provided with an opening 57 adapted to receive the end 56 and when the cover is in closed, latched position the stud forms a means of supporting the overhung portion thereof upon the table top and thus the cover top is rendered capable of supporting weight placed thereon without deflection or injury.

What is claimed is:

1. A device of the class described including in combination a support for an ironing machine, an ironing machine on the support, and a single cover for the ironing machine adapted to enclose the top, front and both ends thereof pivotally mounted upon said support, said cover being swingable in a horizontal plane to enclose or expose the ironing machine.

2. A device of the class described having in combination a table support for an ironing machine and a cover disposed over said table, pivotal support mechanism disposed adjacent one corner of the table, mechanism disposed adjacent one corner of the cover connecting the same with said pivotal support mechanism whereby said cover is pivotally supported at one corner upon the table and made swingable in a horizontal plane to remove the cover from the table, said pivotal support mechanism being provided with spring means capable of swinging said cover to removed position.

3. A device of the class described having in combination a table support for an ironing machine and a cover disposed over said table, pivotal support mechanism disposed adjacent one corner of the table, mechanism disposed adjacent one corner of the cover connecting the same with said pivotal support mechanism whereby said cover is pivotally supported at one corner upon the table and made swingable in a horizontal plane to remove the cover from the table, said pivotal support mechanism is provided with spring means capable of swinging said cover to removed position and latching means co-operating between the table and cover capable of holding said cover in position over the table in opposition to said spring means.

4. A device of the class described having in combination a table support for an ironing machine and a cover disposed over said table, pivotal support mechanism disposed adjacent one corner of the table mechanism disposed adjacent one corner of the cover connecting the same with said pivotal support mechanism whereby said cover is pivotally supported at one corner upon the table and made swingable in a horizontal plane to remove the cover from the table, said pivotal support mechanism and said cover connecting mechanism being made separable whereby said cover may be bodily removed from said support mechanism.

5. In a device of the class described, the combination of a table supporting an ironing machine, a cover member adapted to enclose the ironing machine consisting of a top and three sides with one side open, a pivotal support mechanism disposed at one end of said open side and a co-operative support member secured adjacent one corner of said table whereby said cover member is supported to swing in a horizontal plane to cover or expose the ironing machine.

6. A table to support an ironing machine, a cover for the ironing machine, a bearing supporting the cover for swinging movement in a substantially horizontal plane over or away from the table, and means for adjusting said bearing whereby the cover is caused to swing in predetermined alignment with the table.

7. A table to support an ironing machine, a cover for the ironing machine, a bearing supporting the cover for swinging movement in a horizontal plane into position over or away from the table corresponding to closed or open position, a stationary locking element on the table, a co-operative locking element on the cover registrable with said stationary element and adapted to engage and lock the free end of the cover against vertical movement when the cover is in closed position and means for adjusting said bearing whereby during closing movement the cover is caused to swing in such a path as to bring said locking elements into register.

8. In a device of the class described, the combination of a table supporting an ironing machine, a cover member adapted to enclose the ironing machine consisting of a top and three sides with one side open, a pivotal support mechanism secured adjacent one corner of said table whereby said cover member is supported to swing in a horizontal plane to cover the ironing machine and to provide a support for ironed garments immediately adjacent the operator.

9. In a device of the class described, the combination of a table supporting an ironing machine, a cover member adapted to enclose the ironing machine consisting of a top and three sides with one side open, a pivotal support mechanism secured adjacent one corner of said table whereby said cover member is supported to swing in a horizontal plane to cover the ironing machine and to provide a support for ironed garments immediately adjacent the operator, said pivotal support mechanism including a rotatable supporting bearing, having a recess therein and a horizontally extending arm, a projection on the arm adapted to be received in an opening in the cover member, a stud carried by the cover member and adapted to be received in the recess of the bearing, and means normally tending to rotate the bearing to position the cover member in uncovering position.

10. In a device of the class described, the combination of a table supporting an ironing machine, a cover member adapted to enclose the ironing machine consisting of a top and three sides with one side open, a pivotal support mechanism secured adjacent one corner of said table whereby said cover member is supported to swing in a horizontal plane to cover the ironing machine and to provide a support for ironed garments immediately adjacent the operator, said pivotal support mechanism including a rotatable supporting bearing, having a recess therein and a horizontally extending arm, a projection on the arm adapted to be received in an opening in the cover member, a stud carried by the cover member and adapted to be received in the recess of the bearing, means normally tending to rotate the bearing to position the cover member in uncovering position, and means for holding the cover member in covering position against the action of the means normally tending to rotate the bearing.

HENRY W. ALTORFER.